US006975266B2

(12) United States Patent
Abraham et al.

(10) Patent No.: US 6,975,266 B2
(45) Date of Patent: Dec. 13, 2005

(54) METHOD AND APPARATUS FOR LOCATING POSITION OF A SATELLITE SIGNAL RECEIVER

(75) Inventors: Charles Abraham, Los Gatos, CA (US); Frank van Diggelen, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 0 days.

(21) Appl. No.: 10/464,069

(22) Filed: Jun. 17, 2003

(65) Prior Publication Data

US 2004/0257277 A1 Dec. 23, 2004

(51) Int. Cl.$^7$ .............................................. G01S 5/14
(52) U.S. Cl. ........................ 342/357.02; 342/357.09; 455/456.5
(58) Field of Search ...................... 342/357.02, 357.09; 455/456.5, 456.2

(56) References Cited

U.S. PATENT DOCUMENTS

| | | | | |
|---|---|---|---|---|
| 5,495,257 A | * | 2/1996 | Loomis | 342/357.03 |
| 5,629,707 A | | 5/1997 | Blanchard | |
| 5,663,734 A | * | 9/1997 | Krasner | 342/357.12 |
| 5,680,140 A | * | 10/1997 | Loomis | 342/357.03 |
| 5,751,777 A | | 5/1998 | Zampetti | |
| 5,825,327 A | | 10/1998 | Krasner | |
| 5,912,644 A | | 6/1999 | Wang | |
| 5,945,944 A | * | 8/1999 | Krasner | 342/357.06 |
| 6,067,045 A | * | 5/2000 | Castelloe et al. | 342/357.09 |
| 6,104,338 A | | 8/2000 | Krasner | |
| 6,185,427 B1 | * | 2/2001 | Krasner et al. | 342/357.09 |
| 6,295,022 B1 | * | 9/2001 | Dutka | 342/357.06 |
| 6,353,412 B1 | * | 3/2002 | Soliman | 342/457 |
| 6,473,694 B1 | | 10/2002 | Akopian et al. | 701/213 |
| 6,535,833 B1 | | 3/2003 | Syrjarinne | 702/150 |
| 6,618,690 B1 | | 9/2003 | Syrjarinne | 702/179 |
| 2002/0038182 A1 | * | 3/2002 | Wong et al. | 701/213 |
| 2002/0135518 A1 | | 9/2002 | Rabinowitz et al. | |
| 2003/0058164 A1 | * | 3/2003 | Zhdanov et al. | 342/357.17 |

FOREIGN PATENT DOCUMENTS

WO     WO 98/02762     1/1998

OTHER PUBLICATIONS

J. Haartsen, BLUETOOTH– The universal radio interface for ad hoc, wireless connectivity, Ericsson Review, No. 3, pp. 110–117, 1998.*
P.S. Maybeck, Stochastic Models, Estimation, and Control, vol. 1, Chapter 1, Academic Press, 1979.*
Copy of International Search Report dated Nov. 26, 2004 from corresponding PCT application: PCT/US2004/018960.
G. Welch et al., An Introduction to the Kalman Filter, ACM Siggraph 2001, http://www.cs.unc.edu/-tracker/media/pdf/SIGGRAPH2001_CoursePack_08.pdf, p. 19–25 and 47,2001.*

* cited by examiner

*Primary Examiner*—Thomas H. Tarcza
*Assistant Examiner*—Fred H. Mull
(74) *Attorney, Agent, or Firm*—Moser IP Law Group

(57) ABSTRACT

A method and apparatus for locating position of a satellite signal receiver is described in one example, groups of pseudoranges from the satellite signal receiver to a plurality of satellites are determined at a respective plurality of times. The group of pseudoranges are transmitted to a server, where a position of the satellite signal receiver may be determined using the groups of pseudoranges. In another example, a plurality of groups of pseudoranges are applied to a time-based filter located in the server. The position of the satellite signal receiver arrived from the time-based filter.

20 Claims, 4 Drawing Sheets

METHOD AND APPARATUS FOR LOCATING POSITION OF A SATELLITE SIGNAL RECEIVER

BACKGROUND OF THE INVENTION

1. Field of the Invention

The present invention generally relates to satellite-based position location and, more particularly, to a method and apparatus for locating position of a mobile device.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. The GPS satellites transmit to the receivers satellite-positioning data, so called "ephemeris" data. In addition to the ephemeris data, the satellites transmit the receiver absolute time information associated with the satellite signal, i.e., the absolute time signal is sent as a second of the week signal. This absolute time signal allows the receiver to unambiguously determine a time tag for when each received signal was transmitted by each satellite. By knowing the exact time of transmission of each of the signals, the receiver uses the ephemeris data to calculate where each satellite was when it transmitted a signal. Finally, the receiver combines the knowledge of satellite positions with the computed distances to the satellites to compute the receiver position.

More specifically, GPS receivers receive GPS signals transmitted from orbiting GPS satellites containing unique pseudo-random noise (PN) codes. The GPS receivers determine the time delays between transmission and reception of the signals by comparing time shifts between the received PN code signal sequence and internally generated PN signal sequences.

Each transmitted GPS signal is a direct sequence spread spectrum signal. The signals available for commercial use are provided by the Standard Positioning Service. These signals utilize a direct sequence spreading signal with a 1.023 MHz spread rate on a carrier at 1575.42 MHz (the L1 frequency). Each satellite transmits a unique PN code (known as the C/A code) that identifies the particular satellite, and allows signals transmitted simultaneously from several satellites to be received simultaneously by a receiver with very little interference of any one signal by another. The PN code sequence length is 1023 chips, corresponding to a 1 millisecond time period. One cycle of 1023 chips is called a PN frame. Each received GPS signal is constructed from the 1.023 MHz repetitive PN pattern of 1023 chips. At very low signal levels, the PN pattern may still be observed, to provide unambiguous time delay measurements, by processing, and essentially averaging, many PN frames. These measured time delays are called "sub-millisecond pseudoranges", since they are known modulo the 1 millisecond PN frame boundaries. By resolving the integer number of milliseconds associated with each delay to each satellite, then one has true, unambiguous, pseudoranges. The process of resolving the unambiguous pseudoranges is known as "integer millisecond ambiguity resolution".

A set of four pseudoranges together with the knowledge of the absolute times of transmissions of the GPS signals and satellite positions at those absolute times is sufficient to solve for the position of the GPS receiver. The absolute times of transmission are needed in order to determine the positions of the satellites at the times of transmission and hence to determine the position of the GPS receiver. GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

Note that absolute timing errors also introduce errors as a result of the GPS satellite clock drift, but these are so much smaller than the satellite position error that they can be ignored for the purposes of this explanation (GPS clocks drift typically less than 0.1 nanoseconds per second, and the observed range to the satellite is affected by the GPS clock drift multiplied by the speed of light, this error is less than 0.03 m/s, about 25 thousand times smaller than errors caused by changes in satellite position).

Another time parameter closely associated with GPS positioning is the sub-millisecond offset in the time reference used to measure the sub-millisecond pseudorange. This offset affects all the measurements equally, and for this reason it is known as the "common mode error". The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. A common mode error of 1 microsecond, however, results in a pseudorange error of 1 microsecond multiplied by the speed of light, that is 300 meters. Common mode errors have a large effect on pseudorange computations, and it is practically very difficult to calibrate the common mode error. As such, traditional GPS receivers treat the common mode error as an unknown that must be solved for, along with position, once sufficiently many pseudoranges have been measured at a particular receiver.

The process of searching for and acquiring GPS signals, and reading the ephemeris and related data, including absolute time, for a multiplicity of satellites is time consuming and introduces unacceptable delays in computing the receiver position. In addition, in many situations, there may be blockage of the satellite signals. In these cases, the received signal level can be too low to demodulate and derive the satellite data without error.

Therefore, there exists a need in the art for a method and apparatus for locating position of a mobile GPS receiver that is less susceptible to the

SUMMARY OF THE INVENTION

The disadvantageous associated with the prior art are overcome by a method and apparatus for locating position of a satellite signal receiver. In one embodiment of the invention, a set of pseudoranges from the satellite signal receiver to a plurality of satellites is determined. The set of pseudoranges includes a plurality of groups of pseudoranges determined at a respective plurality of times. The set of pseudoranges is then transmitted to a server, where a position of the satellite signal receiver may be determined using the set of pseudoranges.

In another embodiment, a first plurality of pseudoranges is determined at a first time, and a second plurality of pseudoranges is determined at a second time. The first and second pluralities of pseudoranges are transmitted to a server. A position of the satellite signal receiver is then computed using the first and second pluralities of pseudoranges. In yet another embodiment, a plurality of groups of pseudoranges are applied to a time-based filter located in the server. The position of the satellite signal receiver is derived from the time-based filter.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

A method and apparatus for locating position of a mobile device is described. One or more aspects of the invention relate to server-based processing of multiple pseudoranges over time to locate position of a mobile device. Those skilled in the art will appreciate that the invention may be used with various types of mobile or wireless devices that are location-enabled, such as cellular telephones, pagers, laptop computers, personal digital assistants (PDAs), and like type wireless devices known in the art. In addition, locating position of the mobile device is facilitated by processing global positioning system (GPS) satellite signals. Although GPS is described as an embodiment, other satellite-based systems may be used, such as GLONASS, GALILEO, and the like.

Figure 1:
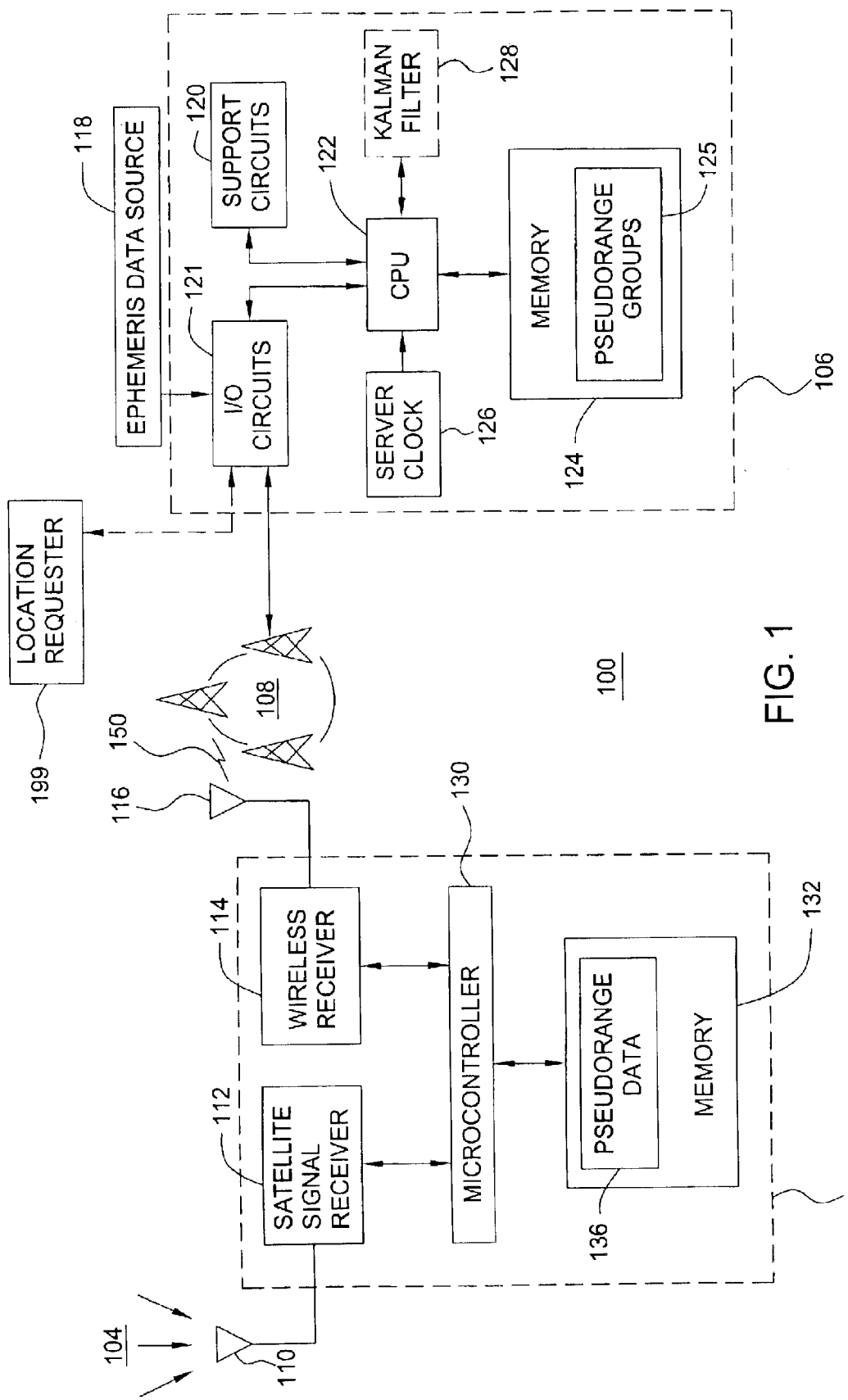
FIG. 1 depicts a block diagram showing one embodiment of a position location system in accordance with the invention.

FIG. 1 depicts a block diagram showing one embodiment of a position location system 100 in accordance with the invention. The position location system 100 comprises a mobile device 102 coupled to a server 106 via a wireless communication system 108. The mobile device 102 measures pseudoranges from the mobile device 102 to a plurality of satellites (not shown). For example, the mobile device 102 may measure pseudoranges to a plurality of GPS satellites. The mobile device 102 transmits the measured pseudoranges to the server 106 using the wireless communication system 108. The server 106 uses the pseudoranges to solve for unknown position of the mobile device 102. The position may be transmitted to the mobile device 102 via wireless communication system 108, or made available to a third-party requester 199 via another manner, such as through the Internet.

In one embodiment of the invention, the mobile device 102 receives aiding information from the server 106 to assist in the measurement of pseudoranges. Such aiding information may include, for example, satellite ephemeris data or a pseudo-range model derived from satellite ephemeris data. An exemplary system that propagates a pseudo-range model to the mobile devices is described in U.S. Pat. No. 6,453,237 (issued Sep. 17, 2002), which is incorporated by reference herein in its entirety. Alternatively, the mobile device 102 may measure pseudoranges without assistance from the server 106.

The mobile device 102 illustratively includes a satellite signal receiver 112, a wireless transceiver 114, a microcontroller 130, and a memory 132. The satellite signal receiver 112 receives satellite signals 104 via antenna 110. The satellite signal receiver 112 processes satellite signals 104 to form pseudoranges in a well-known manner. For example, the satellite signal receiver 112 may be an assisted GPS receiver, as described in U.S. Pat. No. 6,453,237. Alternatively, the satellite signal receiver 112 may be a conventional GPS receiver, The pseudoranges measured by the satellite signal receiver 112 are coupled to the microcontroller 130 and stored in the memory 132. Notably, the memory 132 may store pseudorange data 136. The memory 132 may be random access memory, read only memory, removable storage, hard disc storage, or any combination of such memory devices. The pseudorange data 136 may be transmitted to the server 106 in order to locate the position of the mobile device 102. In particular, the pseudorange data 136 is coupled to the wireless transceiver 114 through the microcontroller 130. The wireless transceiver 114 transmits the pseudorange data 136 via an antenna 116 over a wireless communication link 150 to the wireless communication system 108. The wireless communication system 108 may be a cellular telephone network, for example. In turn, the wireless communication system 108 transmits the pseudorange data 136 to the server 106.

Notably, the mobile device 102 determines multiple groups of pseudoranges, where each group of pseudoranges corresponds to a particular time. Each group of pseudoranges includes pseudoranges from the mobile device to a plurality of satellites determined at a particular time. Each group of pseudoranges does not have to be associated with the same plurality of satellites. For example, two groups of pseudoranges may be associated with two different sets of satellites. Alternatively, some of the pseudoranges among two groups may be associated with the same satellites, while others of the pseudoranges among the two groups may be associated with different satellites. In any case, the multiple groups of pseudoranges are transmitted to the server as the pseudorange data 136. In one embodiment, the multiple groups of pseudoranges are formed into a set of pseudoranges at the mobile device 102 and then the set of pseudoranges is transmitted to the server 106. In another embodiment, each group of pseudoranges is individually transmitted to the server 106.

The mobile device 102 may send the pseudorange data 136 (e.g., either groups of pseudoranges or sets of groups) to the server 106 periodically in accordance with a predetermined time interval. Alternatively, the mobile device 102 may send the pseudorange data 136 to the server only when the mobile device 102 connects to the wireless communication system 108. In yet another example, the mobile device 102 may send the pseudorange data 136 to the server 106 when the position of the mobile device is requested by either a user of the mobile device, or the location requester 199. In general, the server 106 receives multiple groups of pseudoranges determined at different times from the mobile device 102 and uses the multiple groups to compute the position of the mobile device 102.

The server 106 illustratively includes a central processing unit (CPU) 122, input/output (I/O) circuits 121, support circuits 120, a memory 124, and a server clock 126. The support circuits 120 comprise well-known circuits that facilitate operation of the CPU 122, such as clock circuits, cache, power supplies, and the like. The memory 124 may be random access memory, read only memory, removable storage, hard disc storage, or any combination of such memory devices. The memory 124 stores pseudorange groups 125, which are received from the mobile device 102. As described above, each of the pseudorange groups 125 includes a plurality of pseudoranges determined at a particular time. The server clock 126 may be used to provide a time-tag to indicate the time-of-arrival of each of the pseudorange groups 125.

Satellite ephemeris data, for all satellites represented by pseudorange groups 125, is provided to the server 106 from an ephemeris data source 118. The ephemeris data source 118 comprises an external source of ephemeris, such as another satellite signal receiver located in the vicinity of server 106 with a clear view of the sky or a network of satellite signal receivers. An exemplary system for distributing ephemeris data is described in U.S. Pat. No. 6,411,892, issued Jun. 25, 2002, which is incorporated by reference herein in its entirety. Note that, for simplicity, the term "ephemeris" is used to mean the satellite orbit parameters and satellite clock parameters.

The server 106 combines the pseudorange groups 125 with the ephemeris data to locate the position of the mobile device 102. In one embodiment of the invention, the server 106 accumulates pseudorange groups 125 in a current "batch" of pseudoranges, and computes the position of the mobile device 102 when the current batch includes a sufficient number of the pseudorange groups 125. For example, the server 106 may analyze the accumulated pseudorange groups 125 and compute the position of the mobile device 102 when enough pseudorange groups 125 have been received to compute the position of the mobile device 102 to a predefined accuracy.

Figure 2:
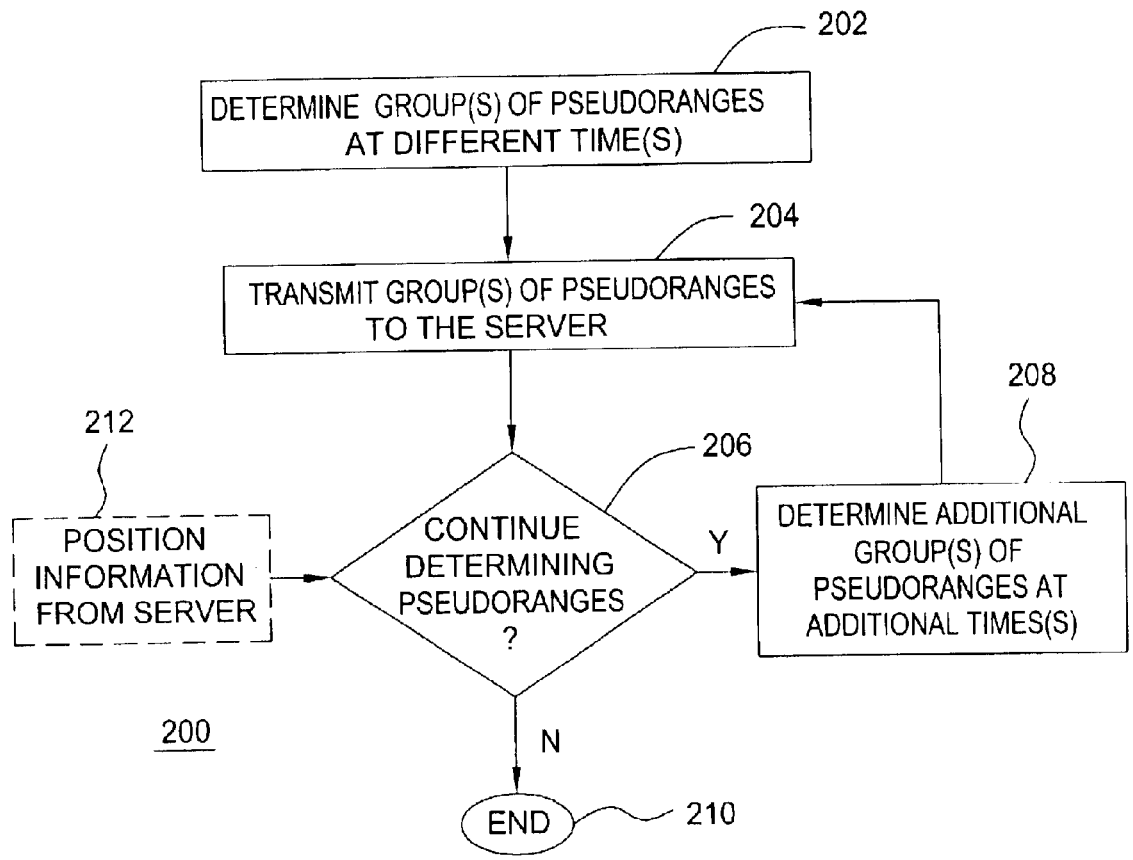
FIG. 2 depicts a flow diagram showing one embodiment of a process of determining pseudoranges at a mobile device in accordance with the invention.

FIG. 2 depicts a flow diagram showing one embodiment of a process 200 of determining pseudoranges at a mobile device in accordance with the invention. Process 200 begins at step 202, where the mobile device determines one or more groups of pseudoranges at different times. At step 204, the mobile device transmits the groups of pseudoranges determined in step 202 to a server. As described above, the groups of pseudoranges may be transmitted to the server as a single set or individually. At step 206, the mobile device determines whether more pseudoranges should be determined and transmitted to the server. In one embodiment, the mobile device determines whether or not to measure one or more additional groups pseudoranges based on position information received from the server. For example, the mobile device may receive position information from the server at step 212. If the position of the mobile device has been located, no more pseudoranges are required and the process 200 proceeds to end step 210. If the mobile device does not receive position information at step 212, more pseudoranges are required and the process proceeds to step 208. At step 208, the mobile device determines one or more additional groups of pseudoranges at additional times. The process 200 then proceeds to step 204 and repeats.

The mobile device may use other indicators at step 206 when determining whether or not to measure additional sets of pseudoranges. In another embodiment, the mobile device may measure and transmit a predefined number pseudorange groups. In yet another embodiment, the mobile device may periodically measure and transmit a group of pseudoranges over a predefined duration. In yet another embodiment, the mobile device may analyze various factors, such as the dilution of precision (DOP) of the measurement set, satellite signal strengths, multipath indicators, and the like to estimate whether a sufficient number of pseudorange measurements have been collected to allow the server to compute position with sufficient accuracy.

Figure 3:
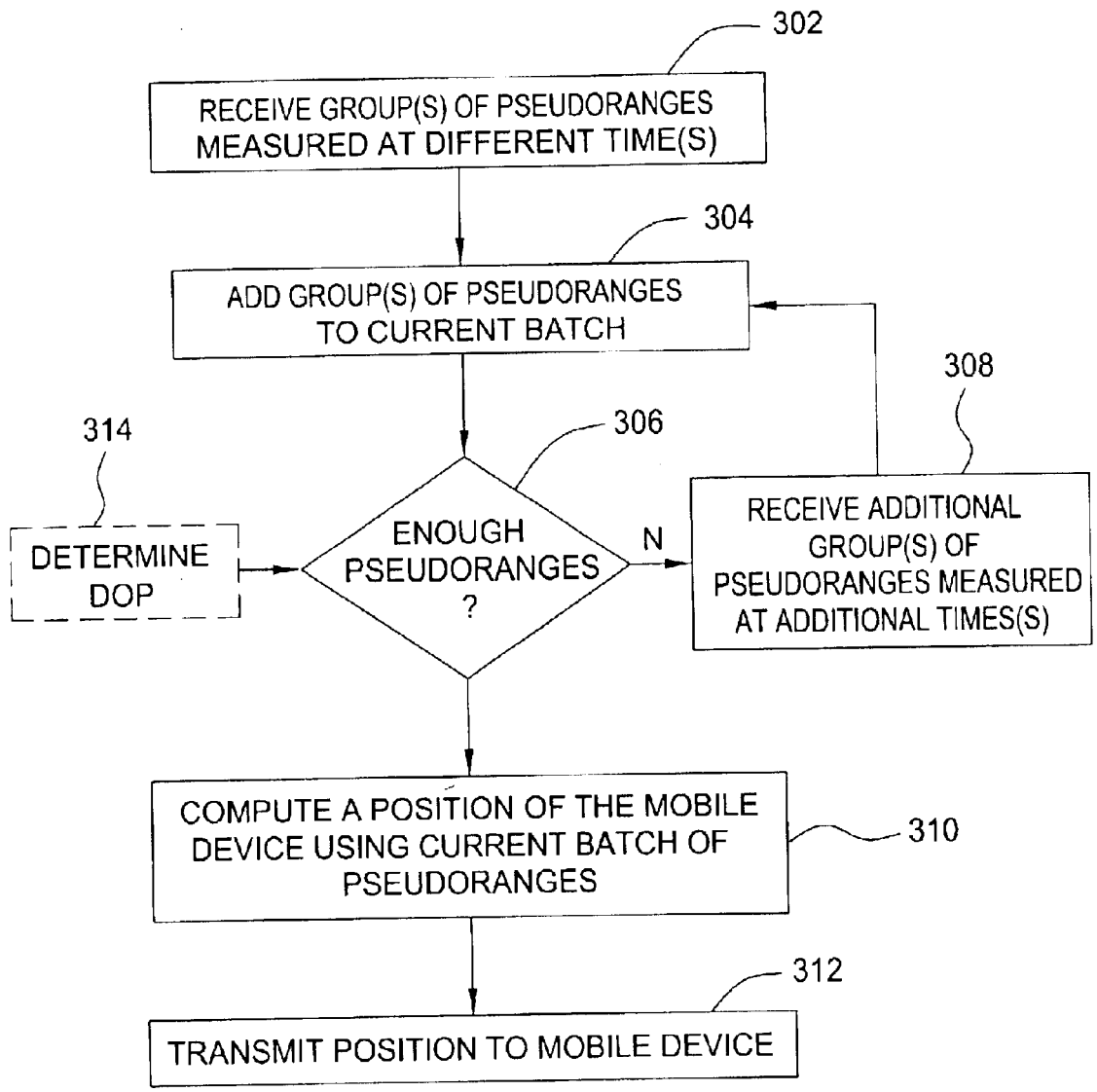
FIG. 3 depicts a flow diagram showing one embodiment of a process for locating position of a mobile device within a server in accordance with the invention.

FIG. 3 depicts a flow diagram showing one embodiment of a process 300 for locating position of a mobile device within a server in accordance with the invention. The process 300 begins at step 302, where the server receives one or more groups pseudoranges measured at different times. At step 304, the server adds the groups of pseudoranges received at step 302 to a current batch of pseudoranges. At step 306, the server determines whether the current batch of pseudoranges contains enough pseudorange information to locate position of the mobile device. In one embodiment, the server analyzes the current batch of pseudoranges to determine if a position of the mobile device can be located to within a predefined accuracy. For example, the server may analyze the current batch of pseudoranges and determine a dilution of precision (DOP) value at step 314. If the server determines that the DOP is above the predefined threshold, the process 300 proceeds to step 308. At step 308, the server receives one or more additional groups of pseudoranges measured at additional times. The process 300 proceeds from step 308 to step 304 and repeats.

If the server determines at step 306 that the DOP is below a predefined threshold, the process 300 proceeds to step 310. At step 310, the server computes a position of the mobile device using the current batch of pseudoranges. At step 312, the server transmits the position to the mobile device. The server may use other indicators at step 306 when determining whether or not enough pseudoranges are in the current batch of pseudoranges to compute the position of the mobile device to within a predefined accuracy. In another embodiment, the server may analyze the current batch of pseudoranges to determine whether the current batch includes a predefined number of independent pseudorange measurements. In yet another embodiment, the server analyzes the quality of the measurement solution by examining one or more of the following: DOP of the measurements; satellite signal strengths; multipath indicators; pseudorange residuals. Notably, as understood by those skilled in the art, pseudorange residuals are a measure of the consistency of the satellite measurements in an overdetermined solution. Small residuals indicate a more accurate fix, whereas large residuals may indicate an error in one or more pseudoranges. The server may also analyze the quality of the measurements by performing a comparison to external measures of position, such as cell radius, cell altitude, or a terrain model, such as in U.S. Pat. No. 6,429,814, issued Aug. 6, 2002, which is incorporated by reference herein in its entirety.

Returning to FIG. 1, in another embodiment of the invention, the server 106 locates position of the mobile device 102 via a time-based filter 128. The time-based filter 128 may be implemented as software stored within the memory 124. The time-based filter 128 filters the pseudorange groups 125. The time-based filter 128 contains states for position, time, velocity, and like type variables. The states of the time-based filter 128 are updated using the pseudorange groups 125 as they arrive from the mobile device 102. By incorporating the time-based filter 128 in the server 106, the invention allows for a centralized time-based filter, rather than incorporating time-based filters among the mobile devices in communication with the server 106. In one embodiment, the time-based filter 128 is a statistically weighted time-based filter, such as a Kalman filter. In the following description, the time-based filter 128 is assumed to be a Kalman filter, although time-based filter 128 is not limited to such, as other forms of filtering, such as Batch Filtering could be used.

Kalman filtering, for example, is a well-known statistical technique that combines knowledge of the statistical nature of system errors with knowledge of system dynamics, as represented by a state space model, to arrive at an estimate of the system state. The state estimate utilizes a weighting function, known as the Kalman gain, which is optimized to produce a minimum error variance. Although the Kalman filter 128 has been disclosed as being implemented as an executable software program, those skilled in the art will understand that the Kalman filter 128 may be implemented in hardware, software, or a combination of hardware and software. Such implementations may include a number of processors independently executing various programs and dedicated hardware such as application specific integrated circuits (ASICs).

More specifically, the Kalman filter 128 comprises a plurality of states corresponding to variables related to the position location problem. The Kalman filter 128 performs two primary functions: First, the Kalman filter 128 extrapolates current values for the plurality of states from previous values for the plurality of states. Second, the Kalman filter 128 updates and refines the current values for the plurality of states based on current measurements. For example, the range from the mobile device 102 to each of four satellites (i=1, 2, 3, 4) may be expressed as follows:

$$(p_1-cb)^2=(x-x_i)^2+(y-y_i)^2+(z-z_i)^2$$

where x, y, and z represent the unknown position variables, $x_i$, $y_i$, and $z_i$ are the ith satellite's position variables (determinable from ephemeris information), and cb represents a common mode error within mobile device 102. Together the four variables x, y, z, and cb represent the state in this example. The above equation may be linearized about a nominal state and expressed as follows:

$$\begin{bmatrix} \Delta PR_1 \\ \Delta PR_2 \\ \Delta PR_3 \\ \Delta PR_4 \end{bmatrix} = \begin{bmatrix} \partial p_1/\partial x & \partial p_1/\partial y & \partial p_1/\partial z & 1 \\ \partial p_2/\partial x & \partial p_2/\partial y & \partial p_2/\partial z & 1 \\ \partial p_3/\partial x & \partial p_3/\partial y & \partial p_3/\partial z & 1 \\ \partial p_4/\partial x & \partial p_4/\partial y & \partial p_4/\partial z & 1 \end{bmatrix} \times \begin{bmatrix} \Delta x \\ \Delta y \\ \Delta z \\ \Delta cb \end{bmatrix}$$

where $\Delta PR_i$ represents the ith pseudorange residual defined as the difference between a measured pseudorange and an estimated pseudorange based on the nominal state, $\Delta x$, $\Delta y$, $\Delta z$, and $\Delta cb$ represent the desired update to the nominal state, and $\delta p_i/\delta x$, $\delta p_i/\delta y$, and $\delta p_i/\delta z$ represents the x, y, and z partial derivatives of the ith measured pseudorange. The particular values of $\delta p_i/\delta x$, $\delta p_i/\delta y$, and $\delta p_i/\delta z$ depend upon the coordinate system used.

In the present example, the plurality of states within the Kalman filter 128 may comprise the unknown offsets in state recited in the linearized equation described above. The Kalman filter 128 propagates current values for the unknown offsets in state from previous values, and updates and refines the propagated values based on current pseudorange measurements. As understood by those skilled in the art, the Kalman filter 128 may comprise various other state variables, such as velocity and acceleration variables, and clock states such as time tag error, and frequency error; and may use various other measurements, such as Doppler measurements, time information, altitude information, and measurements from other sources which are in some way related to the states of the Kalman filter.

Figure 4:
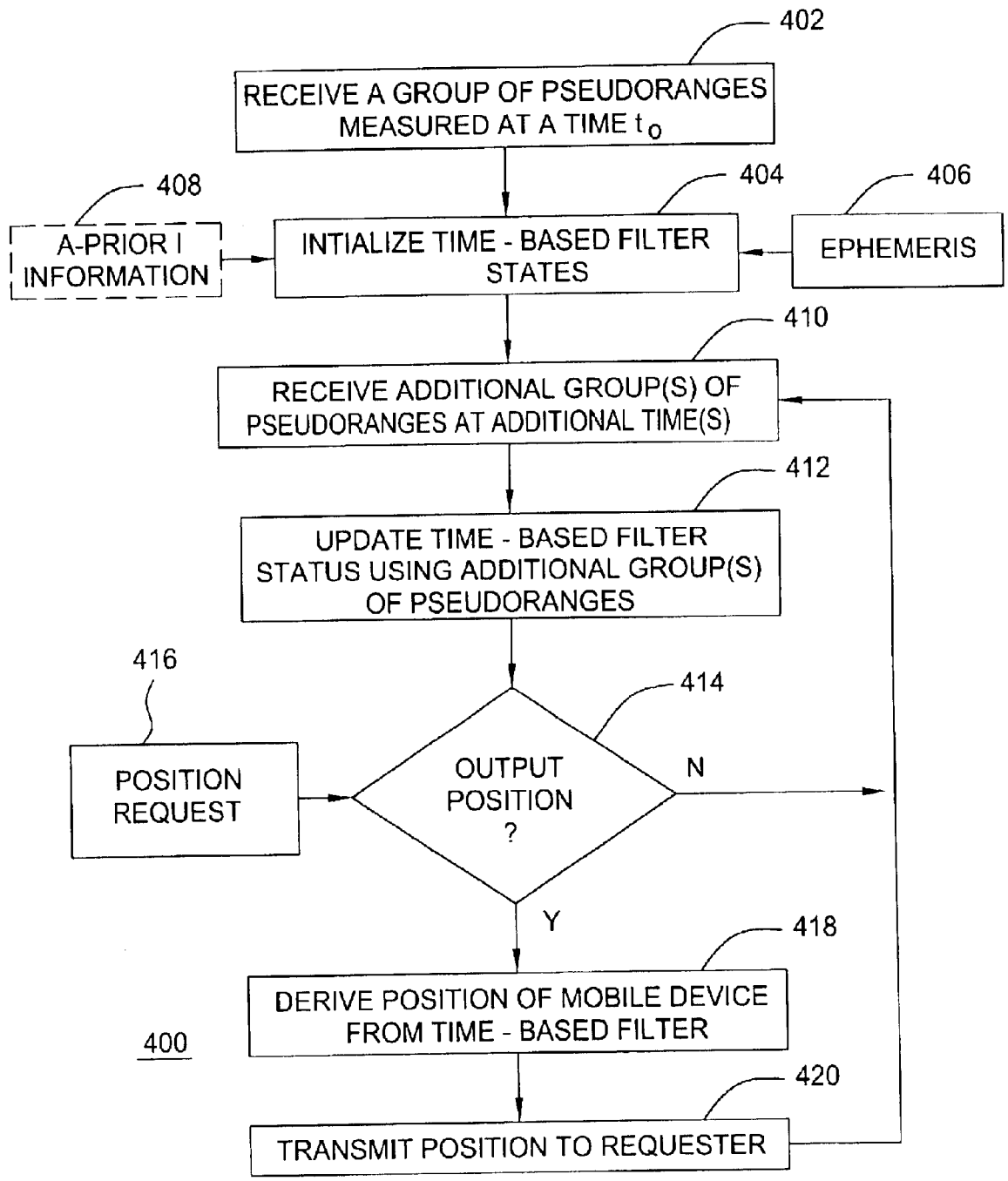
FIG. 4 depicts a flow diagram showing another embodiment of a process of locating position of a mobile device within a server in accordance with the invention.

FIG. 4 depicts a flow diagram showing another embodiment of a process 400 of locating position of a mobile device within a server in accordance with the invention. The process 400 begins at step 402, where the server receives a group of pseudoranges measured at a time to. At step 406, the server receives ephemeris data associated with the plurality of satellites in view of the mobile device. Optionally, at step 408, the server receives a-priori aiding information. A-priori aiding information may include, for example, approximate position of the mobile device, approximate time, approximate altitude of the mobile device, and like type a-prior estimates of position and time variables., At step 404, the server initializes a plurality of states in a time-based filter using the group of pseudoranges measured at time to, ephemeris data, and a-priori aiding information, if available.

At step 410, the server receives one or more additional groups of pseudoranges measured at additional times. Notably, the additional groups of pseudoranges may be transmitted from the mobile device along with the initial group received at step 402 (i.e., within a set of groups of pseudoranges), or may be received separately from the initial group of pseudoranges. At step 412, the server updates the states of the time-based filter using the additional groups of pseudoranges measured at the additional times. That is, the additional groups of measured pseudoranges are used to iteratively refine the computed values for the plurality of states. At step 414, the server determines whether to output position of the mobile device. For example, the server may receive a position request at step 416. In response to the position request, the process 400 proceeds to step 418. Otherwise, the process returns to step 410.

At step 418, the server derives a position of the mobile device from the time-based filter. At step 420, the server transmits the position of the mobile device to the position requester. For example, the server may transmit the position to the mobile device or to a third-party location requester, as described above.

Method and apparatus for locating position of a mobile device has been described. In one embodiment, the mobile device measures and transmits a plurality of groups of pseudoranges to a server over time. The server accumulates the groups of pseudoranges and, in response to a request for position, outputs the position of the mobile device when enough groups of pseudoranges have been received. In another embodiment, the server applies each groupst of pseudoranges to a time-based filter. In response to a request for position, the server derives the position from the time-based filter. In either embodiment, the invention utilizes pseudorange information obtained over time to locate the position of the mobile device. By locating position using pseudoranges obtained over time, the invention is less susceptible to blockage of satellite signals at the mobile device and the mobile device has more of an opportunity to collect sufficient measurements. At the same time, in good signal operating environments, the server is able to quickly produce accurate positions, without waiting the additional time for more pseudorange measurements to be produced by the mobile device.

Although the invention has been described as using ephemeris data for obtaining satellite orbits and clock parameters, equivalent descriptions of such parameters can also be used. There are many equivalent descriptions of the satellite orbits that can be used, including descriptions of the orbits as viewed from the mobile device. The satellite ephemeris could be replaced by a model of the expected pseudoranges, a model of the expected geometric ranges and a clock model, or by another combination of models that describe the satellite orbits and/or clock parameters. Since all these models serve similar purposes, the term "ephemeris" as used hereinabove means satellite orbital parameters, satellite clock parameters, or like type functionally equivalent data.

Although the methods and apparatus of the invention have been described with reference to GPS satellites, it will be appreciated that the teachings are equally applicable to positioning systems that utilize pseudolites or a combination of satellites and pseudolites. Pseudolites are ground-based transmitters that broadcast a PN code (similar to the GPS signal) that may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

Moreover, in the preceding discussion, the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

While the foregoing is directed to illustrative embodiments of the present invention, other and further embodiments of the invention may be devised without departing from the basic scope thereof, and the scope thereof is determined by the claims that follow.

What is claimed is:

1. A method, comprising:
   determining a first group of pseudoranges from a satellite signal receiver to a plurality of satellites;
   transmitting the first group of pseudoranges to a server to define a batch of pseudoranges;
   obtaining at least one additional group of pseudoranges at the satellite signal receiver in response to an indication that said batch of pseudoranges requires additional pseudoranges;
   transmitting the at least one additional group of pseudoranges to the server; and
   adding the at least one additional group of pseudoranges to the batch at the server.

2. The method of claim 1, further comprising:
   computing a position of the satellite signal receiver using the batch of pseudoranges.

3. A method, comprising:
   determining groups of pseudoranges from a satellite signal receiver to a plurality of satellites over a period of time;
   transmitting the groups of pseudoranges to a server;
   applying the groups of pseudoranges to a time-based filter located in the server; and
   deriving a single position of the satellite signal receiver directly from the groups of pseudoranges using the time-based filter without first calculating position from each group.

4. The method of claim 3, wherein the applying step comprises:
   initializing a plurality of states within the time-based filter;
   using a first group of the groups pseudoranges to update the plurality of states; and
   iteratively updating the plurality of states using the remaining groups of pseudoranges.

5. The method of claim 3, further comprising:
   receiving a-priori aiding information;
   initializing a plurality of states within the time-based filter using the a-priori aiding information; and
   iteratively updating the plurality of states using the groups of pseudoranges.

6. The method of claim 5, wherein the a-priori aiding information comprises at least one of an approximate position of the satellite signal receiver and an approximate time of reception of satellite signals.

7. The method of claim 3, wherein the time-based filter is a statistically weighted time-based filter.

8. The method of claim 7, wherein the statistically weighted time-based filter is a Kalman filter.

9. The method of claim 1, wherein each group of pseudoranges in the batch is transmitted from the satellite signal receiver to the server using a wireless communication system.

10. The method of claim 1, further comprising at least one of:
    transmitting the position to the satellite signal receiver; and
    transmitting the position to a requester over a communication network.

11. A position location server, comprising:
    an interface for receiving groups of pseudoranges from a satellite signal receiver via a wireless communication network;
    a processor for defining a batch of pseudoranges from a first group of pseudoranges received by the interface, for requesting at least one additional group of pseudoranges from the satellite signal receiver in response to an indication that said batch of pseudoranges requires additional pseudoranges, and for adding the at least one additional group of pseudoranges to the batch of pseudoranges.

12. The server of claim 11, wherein the processor is further configured to:
    compute a position of the satellite signal receiver using the batch of pseudoranges.

13. A system for locating position of a satellite signal receiver, comprising:
    a mobile device having a satellite signal receiver for determining groups of pseudoranges and a wireless transceiver for transmitting the groups of pseudoranges over a wireless communication network; and
    a server in wireless communication with the mobile device for defining a batch of pseudoranges from a first group of pseudoranges received from the mobile device, for requesting at least one additional group of pseudoranges from the mobile device in response to an indication that said batch of pseudoranges requires additional pseudoranges, for adding the at least one additional group of pseudoranges to the batch of pseudoranges, and for computing a position of the mobile device using the batch of pseudoranges.

14. The system of claim 13, wherein the server is further configured to at least one of:

transmit the position to the satellite signal receiver; and transmit the position to a requester over a communication network.

15. A position location server, comprising:

an interface for receiving groups of pseudoranges from a satellite signal receiver over a period of time via a wireless communication system;

a time-based filter for processing the groups of pseudoranges; and a processor for deriving a single position of the satellite signal receiver directly from the groups of pseudoranges using the time-based filter without first calculating position from each group.

16. The server of claim 15, wherein the time-based filter is a statistically weighted time-based filter.

17. The server of claim 16, wherein the statistically weighted time-based filter is a Kalman filter.

18. A system for locating position of a satellite signal receiver, comprising:

a mobile device having a satellite signal receiver for determining groups of pseudoranges over a period of time and a wireless transceiver for transmitting the groups of pseudoranges over a wireless communication network; and a server in wireless communication with the mobile device having a time-based filter for processing the groups of pseudoranges received from the mobile device and a processor for deriving position of the mobile device from the time-based filter.

19. The system of claim 18, wherein the time-based filter is a statistically weighted time-based filter.

20. The system of claim 19, wherein the statistically weighted time-based filter is a Kalman filter.

* * * * *

UNITED STATES PATENT AND TRADEMARK OFFICE
CERTIFICATE OF CORRECTION

PATENT NO.       : 6,975,266 B2
APPLICATION NO.  : 10/464069
DATED            : December 13, 2005
INVENTOR(S)      : Charles Abraham et al.

It is certified that error appears in the above-identified patent and that said Letters Patent is hereby corrected as shown below:

On the Title page, item (56), under "Other Publications", in column 2, line 9, after "edu/" delete "-" and insert -- ~ --, therefor.

On the Title page, item (56), under "Other Publications", in column 2, line 10, delete "p." and insert -- pp. --, therefor.

On the Title page, item (56), under "Other Publications", in column 2, line 11, delete "47.2001" and insert -- 47, 2001. --, therefor.

On the Title page, item (57), under "Abstract", in column 2, line 2, delete "described in" and insert -- described. In --, therefor.

On the Title page, item (57), under "Abstract", in column 2, line 5, delete "group" and insert -- groups --, therefor.

On the Title page, item (57), under "Abstract", in column 2, line 10, delete "arrived" and insert -- derived --, therefor.

In column 1, line 23, after "transmit" insert -- to --.

In column 2, line 55, after "the" insert -- blockage of satellite signals. --.

In column 4, line 25, after "receiver" delete "," and insert -- . --, therefor.

In column 7, line 41, delete "($p_1$" and insert -- ($p_1$ --, therefor.

In column 7, line 61, delete "$\delta p_i$, $\delta y$," and insert -- $\delta p_i / \delta y$, --, therefor.

In column 10, line 6, in Claim 3, delete "fromeach" and insert -- from each --, therefor.

In column 10, line 11, in Claim 4, after "groups" insert -- of --.

UNITED STATES PATENT AND TRADEMARK OFFICE
CERTIFICATE OF CORRECTION

| | |
|---|---|
| PATENT NO. | : 6,975,266 B2 |
| APPLICATION NO. | : 10/464069 |
| DATED | : December 13, 2005 |
| INVENTOR(S) | : Charles Abraham et al. |

It is certified that error appears in the above-identified patent and that said Letters Patent is hereby corrected as shown below:

In column 12, line 19, in Claim 19, delete "fitter." and insert -- filter. --, therefor.

Signed and Sealed this

Twenty-ninth Day of May, 2007

JON W. DUDAS
*Director of the United States Patent and Trademark Office*